United States Patent [19]

Loos

[11] Patent Number: 4,967,783
[45] Date of Patent: Nov. 6, 1990

[54] RECIRCULATION VALVE WITH PILOT VALVE

[75] Inventor: George Loos, North Wales, Pa.

[73] Assignee: Keystone International Holdings Corp., Wilmington, Del.

[21] Appl. No.: 483,568

[22] Filed: Feb. 22, 1990

[51] Int. Cl.⁵ .............................................. G05D 7/01
[52] U.S. Cl. ..................................... 137/116; 137/117
[58] Field of Search ........................ 137/115, 116, 117

[56] References Cited

U.S. PATENT DOCUMENTS

| | | | |
|---|---|---|---|
| 4,019,527 | 4/1977 | Brand | 137/115 |
| 4,095,611 | 6/1978 | Hetz | 137/115 |

Primary Examiner—Robert G. Nilson
Attorney, Agent, or Firm—Ferrill and Logan

[57] ABSTRACT

A recirculation valve with pilot valve. The claimed invention comprises a housing containing an inlet chamber for receiving liquid from a pump, an outlet chamber for transporting liquid downstream of said valve and a recirculation port for recirculating liquid back to said pump; check valve means dividing said inlet and outlet chambers and extending substantially transverse thereto, the check valve means opening to permit the flow of liquid between the inlet and outlet chambers when the check valve means is in a first position and preventing flow when the check valve means is in a second position; a chamber for transferring liquid between said inlet chamber and a by-pass valve means, the by-pass valve means being axially aligned with said check valve means and comprising an outer sleeve having a plurality of seats and a slidable inner stem, said inner stem having a plurality of lands which slidable mate with said seats to close off flow through said by-pass valve when said check valve is in a first position and which disalign to permit flow through said by-pass valve when said check valve means is in a second position. The movement of said recirculation stem is directly controlled by a pilot valve which regulate the water pressure and quantity of a piston chamber located beneath the stem.

16 Claims, 8 Drawing Sheets

RECIRCULATION VALVE WITH PILOT VALVE

FIELD OF THE INVENTION

The present invention is directed to automatic recirculation valves. Specifically, the present invention is directed to an improved pilot valve for bypass recirculation control in centrifugal pumping systems.

BACKGROUND OF THE INVENTION

Recirculation valves are frequently utilized to cool centrifugal pumps. During periods of low downstream demand, the water in the centrifugal pump remains stationary. Over time, the stationary water can heat up due to the continuing operation of the pump. Recirculation valves operate to permit a constant circulation of fluid back to the pump during periods of low downstream demand.

Recirculation of the output from the pump can be provided by manual operation of the recirculation valve. This method is expensive and unreliable. Alternatively, recirculation can be provided by a bypass valve controlled by a flowmeter which detects flow in the inlet side of the pump. When the flow on the inlet side of the pump drops below the minimum required to cool the pump, the flowmeter opens the bypass valve, thereby maintaining the pump output at the required minimum, and diverting that portion of the flow not required by the feed heater to a sump connected to the inlet of the pump. Such an arrangement involves relatively complex and expensive apparatus and has not been found to be satisfactory. and expensive apparatus and has not been found to be satisfactory. An alternative to both of the techniques described above and one which has been found to be generally satisfactory for most systems, involves the use of a modulating flow control valve assembly including a main check valve, the position of which is responsive to the demand flow requirements of the heater and an on-off bypass valve for recirculating flow back to the pump during the periods of low demand by the heater.

While valves of the type described above are known in the art, they are not entirely satisfactory in certain systems, particularly in large steam generating plants with minimum flow requirements. One problem with valve assemblies of the type described above is caused by the on-off operation of the pump. Abrupt changes cause a water hammer effect, that is, sudden surges in the output of the pump which may be detrimental to the pump, the piping system, and the remainder of the associated fluid system.

U.S. Pat. No. 4,095,611, issued to Yarway Corporation of Blue Bell, Pa., and now assigned to Keystone International Holdings Corporation, the assignee of the present invention, is directed to a valve mechanism which provides modulating control. While the valve disclosed therein vastly improves over prior art apparatus, it incorporates a complex attachment mechanism to control the by-pass valve. Specifically, the by-pass valve is not directly coupled to the check valve assembly but rather is connected through a lever and piston arrangement. Accordingly, the valve is more expensive to repair and more difficult to replace. Second, the valve disclosed in this patent requires additional moving parts to control the movement of the recirculation valve mechanism which may impede the precision with which the by-pass valve can be controlled.

Due to the problems associated with by-pass valves containing mechanical linkages, pilot valves have also been utilized to control the flow of liquid through a recirculation valve. Pilot valves eliminate the need for linkages. U.S. Pat. No. 4,019,527 issued to Yarway Corp., and now also assigned to Keystone International Holdings Corp., assignee of the present invention, discloses such a device. The device disclosed in U.S. Pat. No. 4,019,527 utilizes a pilot valve to control the operation of the recirculation valve. While the pilot valve disclosed in U.S. Pat. No. 4,019,527 offers numerous advantages, the recirculation valve may stall at high pressures Water contained in the pilot valve piston chamber of U.S. Pat. No. 4,019,527 can only drain through two narrow horizontal flow conduits. Because of the relative positions of the check valve and the recirculation valve, the slow drainage of the recirculation valve may impede the downward movement of the check valve.

It is an object of this invention to provide a modulating recirculation flow control valve assembly which improves over U.S. Pat. No. 4,095,611 and which includes a check valve and bypass flow control valve which are coupled such that the flow through the by-pass valve varies inversely with the flow through the check valve.

It is a further object of this invention to provide a modulating flow control valve assembly including a check valve and bypass flow control valve which responds rapidly.

It is still a further object of the present invention to provide a recirculation valve which provides for modulating by-pass control through a novel pilot valve arrangement.

It is an additional object of this invention to provide a recirculation valve controlled by a pilot which can drain quickly and which will not impede the movement of the check valve.

It is an additional object of the present invention to provide a pilot valve controlled recirculation valve in which the motion of the check valve is not impeded by the relative position of the recirculation valve.

It is yet a further object of the present invention to provide a recirculation valve having a pilot valve with variable switch point.

It is yet an additional object of this invention to provide a modulating flow control valve assembly which is simple, rugged, economical, and which is particularly useful in steam generating plants in order to maintain a minimum output from a feed water pump.

It is still yet a further object of the present invention to provide a recirculation valve which can easily be inserted, adjusted, repaired and replaced.

It is a further object of the present invention to provide a recirculation valve which can function in either a modulating or on/off configuration.

SUMMARY OF THE INVENTION

In accordance with the present invention, a recirculation valve comprising a housing containing an inlet chamber for receiving liquid from a pumping station, an outlet chamber for transporting liquid out of said valve in a downstream direction, and a recirculation port for recirculating liquid back to said pump; check valve means dividing said inlet and outlet chambers and extending substantially transverse thereto, said check valve means opening to permit the flow of liquid between said inlet and outlet chambers when said check valve means is in a first position and closing to prevent said flow when said check valve means is in a second position; a recirculation channel for transporting liquid between said inlet chamber and by-pass valve means, said by-pass valve means being axially aligned with said check valve means and controlling the flow of liquid between said recirculation channel and said recirculation port, said by-pass valve means comprising a sleeve having at least one seat and a slidable stem having at least one land to slidably mate with said seat to close of flow through said by-pass valve and to disalign from said seat to permit flow through said by-pass valve; a piston chamber in communication with said slidable stem for moving said slidable stem between said open and closed positions, said stem closing off the flow through said by-pass valve when said piston chamber fills with liquid, said stem disaligning to permit said flow through said by-pass valve when said piston chamber empties of liquid, pilot valve means integral with said stem for controlling the level of liquid in said piston chamber, said pilot valve closing to fill said piston chamber when said check valve is in said first position, and opening to drain said piston chamber when said check valve is in a second position; and variable means coupled to said check valve for controlling said pilot valve.

BRIEF DESCRIPTION OF THE DRAWINGS

The foregoing summary, as well as the following detailed description will be better understood when read in conjunction with the drawings appended hereto. For the purpose of illustrating the invention, there is shown in the drawings an embodiment which is presently preferred, it being understood however, that this invention is not limited to the precise arrangement and instrumentalities shown.

DETAILED DESCRIPTION OF THE PREFERRED EMBODIMENT

The present invention is described with reference to the enclosed Figures wherein the same numbers are used where applicable. Referring to the Figures, there is disclosed a modulating flow control valve assembly 10 particularly adapted to be used in a steam generating system to control the output flow between a feed water pump and a feed water heater. It should be understood, however, that a valve assembly in accordance with this invention may be utilized between other pressure sources and demand systems in which a pump is continuously operative and wherein the demand system has a variable flow requirement. In order to simplify the description of the preferred embodiment of the invention, reference will be made throughout the disclosure to a centrifugal pump and a heater.

Figure 1:
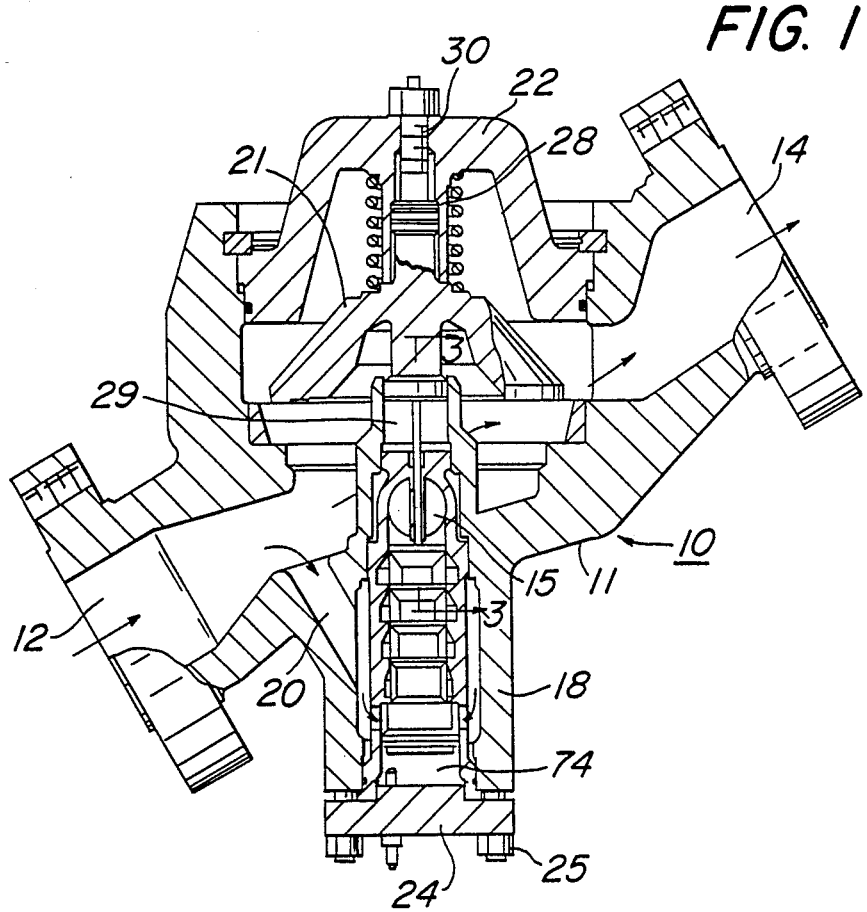
FIG. 1 is a section view of the recirculation valve of the preferred embodiment in an open mode.
Figure 2:
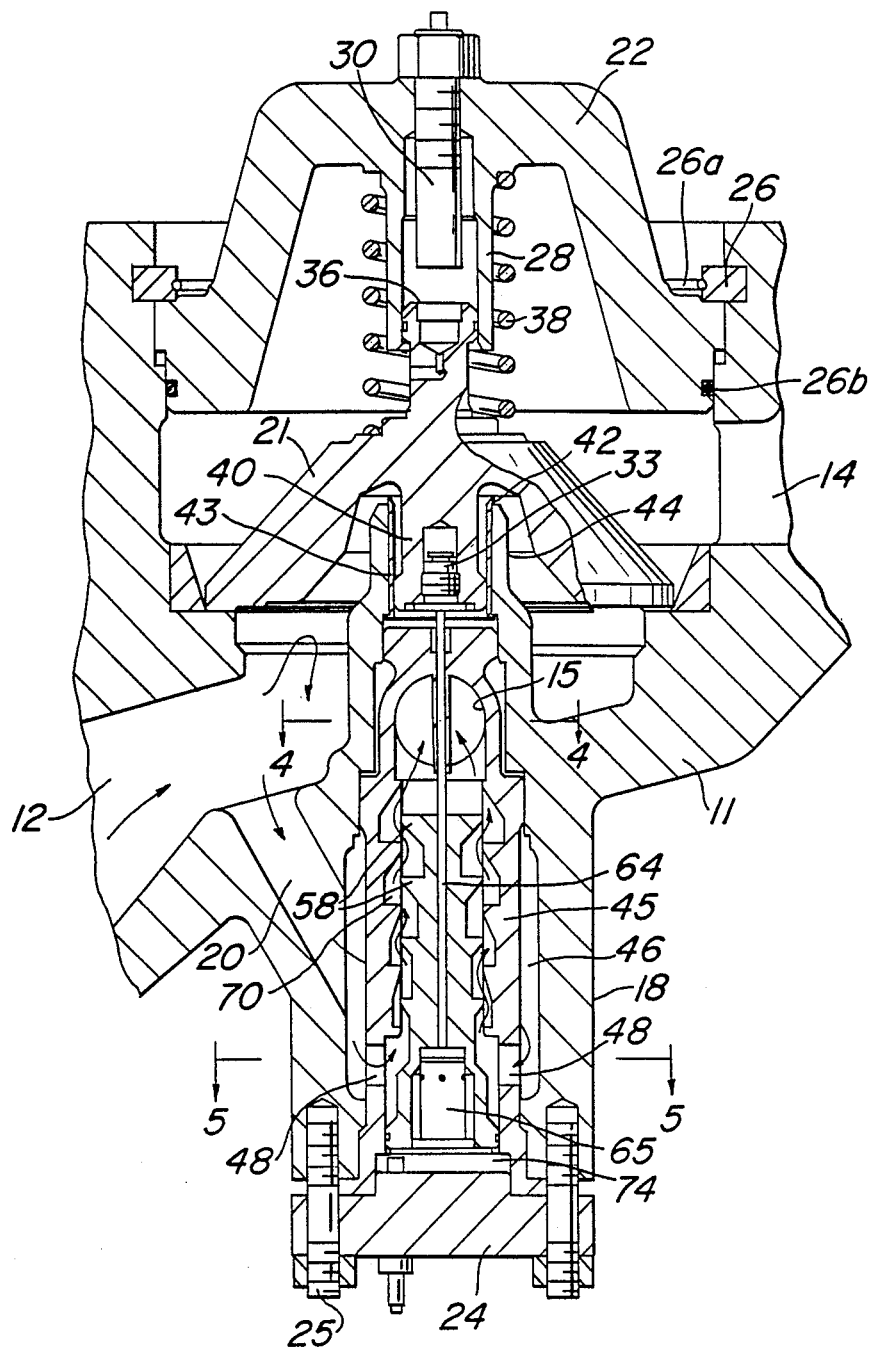
FIG. 2 is a section view of the recirculation valve of the preferred embodiment in a closed mode.
Figure 3:
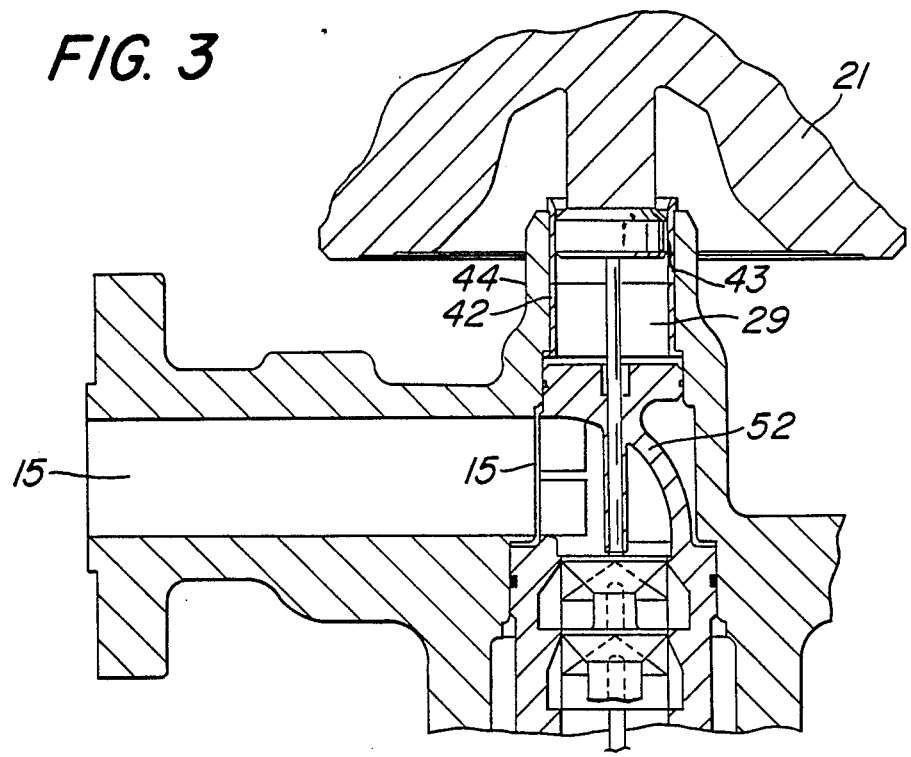
FIG. 3 is a section view of the recirculation check valve and recirculation conduit of the preferred embodiment along line 3—3 of FIG. 1.
Figure 4:
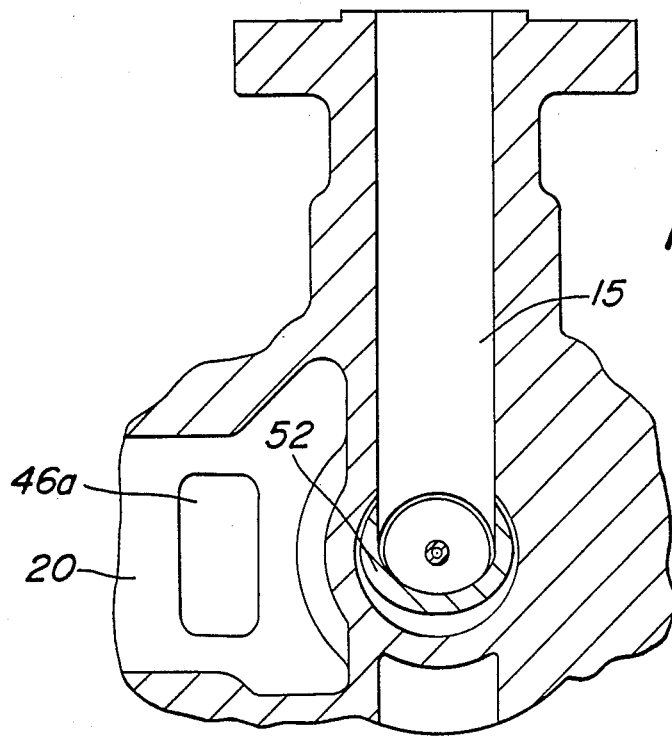
FIG. 4 is a plan view of the recirculation port along line 4—4 of FIG. 2.

Referring to FIGS. 1 and 2, the recirculation valve of the present invention is shown. The valve assembly 10 includes a main housing 11 having an inlet chamber 12 and an outlet chamber 14. Housing 11 may be constructed from cast steel or other suitable materials. In the present invention, the inlet and outlet ports assume an "in-line" configuration, i.e., they are in direct alignment along the same plane of reference. Valve assembly 10 further incorporates a check valve 21 and recirculation assembly 18 extending transverse to the inlet and outlet ports. The inlet chamber 12 is connected to the recirculation system 18 via a recirculation conduit 20.

The check valve assembly 21 and recirculation system 18 are retained in position between a bonnet 22 and retaining end plate 24 which is bolted 25 to the housing. As will be discussed herein, the retaining end plate 24 functions as the floor of a piston chamber 74 which controls the longitudinal thrust of the recirculation valve. The bonnet 22 is attached to the housing via segmented ring 26 and segmented ring retainer 26a. The bonnet 22 contains a sleeve 28 which extends partially into the interior of the valve housing. A bolt 30 extends through the center of the bonnet, for the purpose of removing and installing a bonnet and disk assembly.

The check valve 21 of the present invention is dome shaped and is superimposed over a set 32 which divides the inlet and outlet chambers. A flow ring 34, cut to different angles, determines the flow characteristic of the check valve. The seat is metal to metal. The check valve contains a top sleeve portion 36 extending through its top which slides in the sleeve 28 of the bonnet and the bolt 30. A biasing spring 38 situated between the bonnet 22 and top sleeve 36 of the check valve biases the check valve downward toward a closed position. In operation, the check valve 21 is responsive to the demand requirements of the heater and is controlled by flow of fluid from the pump to the heater.

Figure 6:
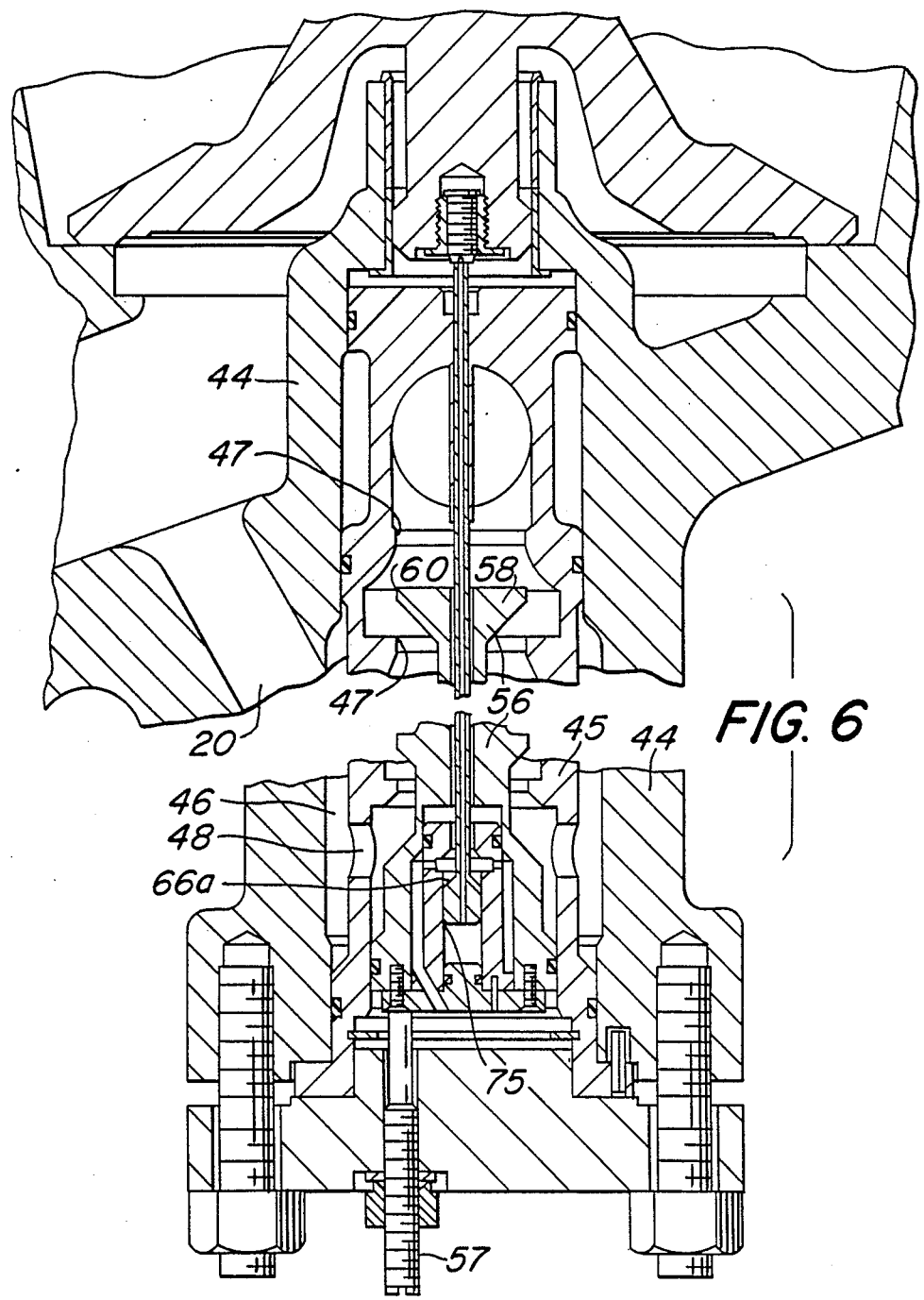
FIG. 6 is an isolated view of the pilot value of the preferred embodiment in an opened position.
Figure 8:
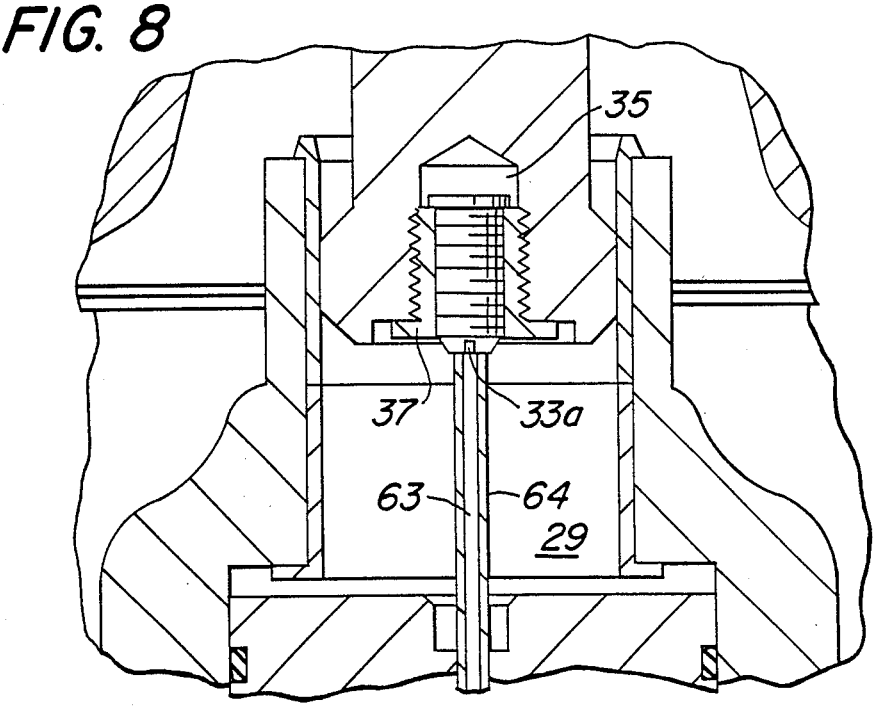
FIG. 8 is an isolated view of the check valve and adjustable switch point activator of the present invention.

The check valve has a central shaft 40 which slides within a throat 42 of an outer sleeve 44 extending transverse to the inlet and outlet chambers which is integral to the housing. In operation, the check valve 21 is responsive to the demand requirements of the heater and is controlled by the flow of fluid from the pump to the heater. As will be discussed in greater detail hereinafter, a gap 43 (not shown) between central shaft and the throat permits water to flow into a chamber 29 located beneath the check valve within the throat 42. From there, water flows down the center of a pilot valve capillary stem 63 toward a pilot valve chamber 67. Referring to FIGS. 6 and 8, the bottom of the check valve has a central bore 31 which holds a threaded switch point screw 33, which may threaded into a recess 35 within check valve 21. The switch point screw 33 is threaded into threaded sleeve 37 which attaches to the underside of the check valve 21. As will be discussed, the longitudinal adjustment of the switch point screw 33 varies the switch point at which the pilot valve is uncoupled from its seat by the descending check valve. The screw head 33a provides a conduit for water to flow from the chamber 29 into the center of capillary stem 63.

The check valve 21 is controlled by the pressure differential across the valve seat, i.e., by the demand flow requirements of the heater. When the demand flow requirements of the heater increase, the pressure differential across the valve seat 32 is such that the check valve 21 moves upward toward the bonnet 22. The valve surface accordingly moves upward away from the valve seat thereby allowing flow between the inlet and outlet chambers. Because of the beveled flow ring 34, the size of the opening across the valve seat 30 increases as the check valve member 21 moves upward. Accordingly, increased flow is permitted as the check valve member opens. Conversely, decreased flow is permitted as the check valve member 21 moves toward the valve seat 30 under the influence of a counter pressure differential. The flow across the main check valve 21 is thereby modulated.

The recirculation pilot valve system of the preferred embodiment is now described with reference to FIGS. 2-4, 6, 8 and 9. The recirculation system is slidably retained within the integral outer sleeve 44. A recirculation conduit 20 joins the inlet chamber and the recirculation system. The recirculation valve comprises an inner sleeve 45 which is slidably inserted within the integral outer sleeve 44 and which is axially aligned with the check valve 21. An area defining a water chamber 46 separates the outer and inner sleeves, and is filled with water from the recirculation conduit 20 via opening 46a.

Figure 7:
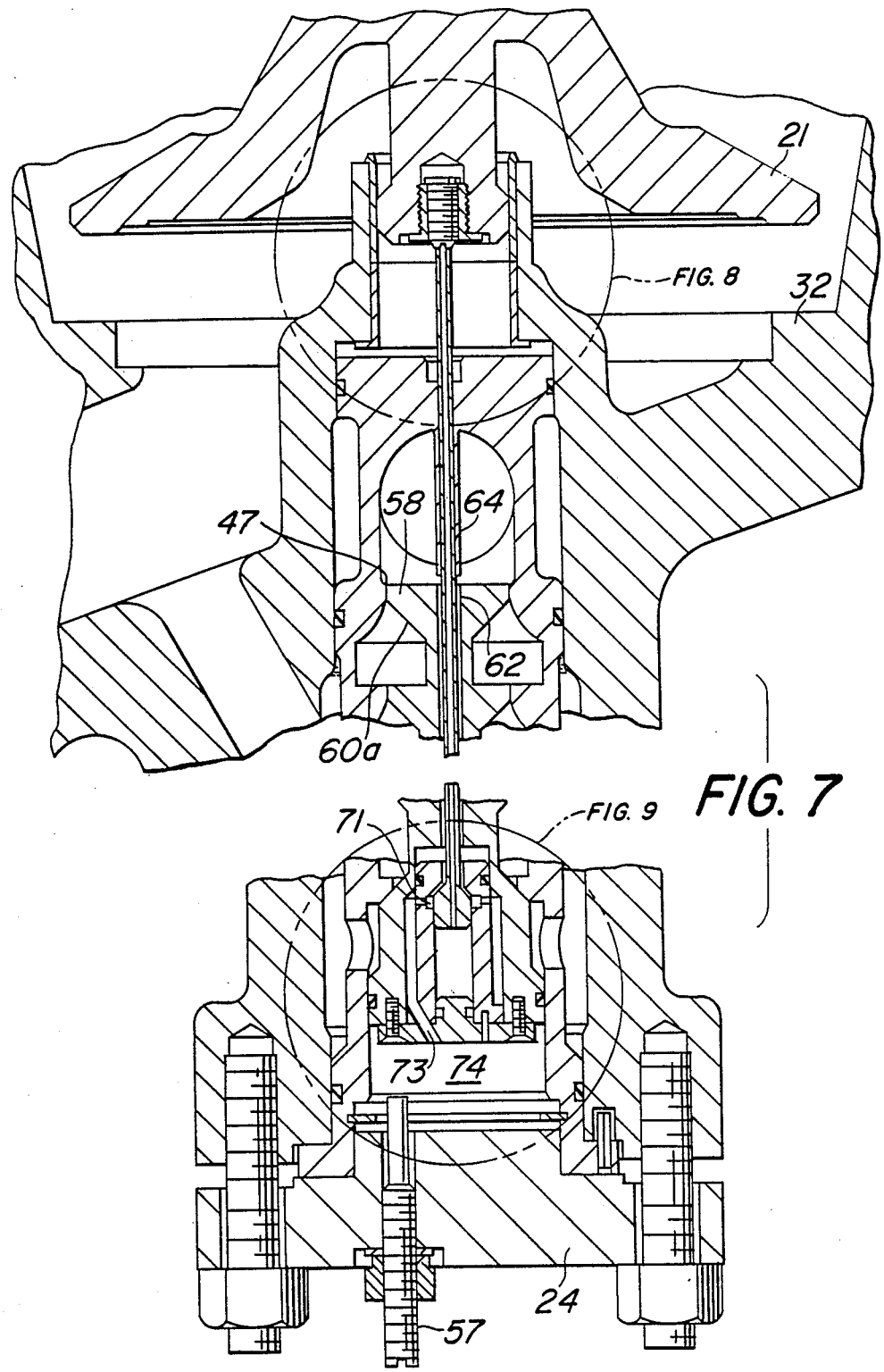
FIG. 7 is an isolated view of the pilot valve of the preferred embodiment in a closed position.

As shown in FIGS. 2, 6 and 7, the by-pass valve comprises a stem 56 which slidably fits within the inner sleeve 45. The stem 56 comprises a series of individual segments 58, the width of which gradually decrease in the direction of the check valve. Each segment 58 has a land 60 which as will be described herein, slidably mates with a seat 47 on the interior of the inner sleeve during operation. The lands are beveled 60a to improve the flow of water through the valve and to permit throttling. A screw 57 extending through end piece 24 adjusts the relative position recirculation of the stem.

Figure 5:
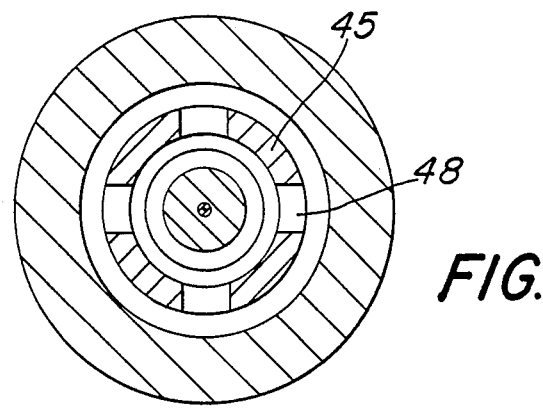
FIG. 5 is a plan view of the recirculation channel along line 5—5 of FIG. 2.

When the lands and seats are not aligned, fluid travels up the recirculation valve in a serpentine channel 70 defined by the inner sleeve and stem (see flow arrow in FIG. 2), and is redirected by the curvilinear outlet section 52 out the recirculation port 15. The mouth of the recirculation port 15 includes a turbo cascade 52a which facilitates flow out of the recirculation conduit. As shown in the plan view of FIG. 5, the recirculation system comprises the outer housing which is separated from the inner sleeve by the water chamber. The inner sleeve 45 contains four evenly spaced ports 48 which permit water to enter the recirculation system.

Referring to FIGS. 6, 7, 8 and 9, the stem 56 has a central bore 62 which holds a capillary pilot valve 64. The bore 62 widens at the end opposite the check valve. The widened section 62a houses a pilot valve seat 65 which is inserted into the widened section 62a and bolted to the bottom of the stem 56 by an end piece 68. The pilot valve seat 65 comprises a cylindrical chamber 67 which houses the bulbous end 66 of the pilot valve capillary 64. The pilot valve seat contains two ports 71 at the end of the chamber 67 opposite end piece 68 which connect the pilot valve chamber with a hollow sleeve 69 created between the inner wall of the valve stem and the cylindrical pilot valve seat. A conduit 73 through end piece 68 joins the hollow sleeve 69 and a piston chamber 74 situated between the recirculation stem end piece 68 and end plate 24. The piston chamber 74 controls the longitudinal movement and position of the recirculation valve stem.

Figure 9:
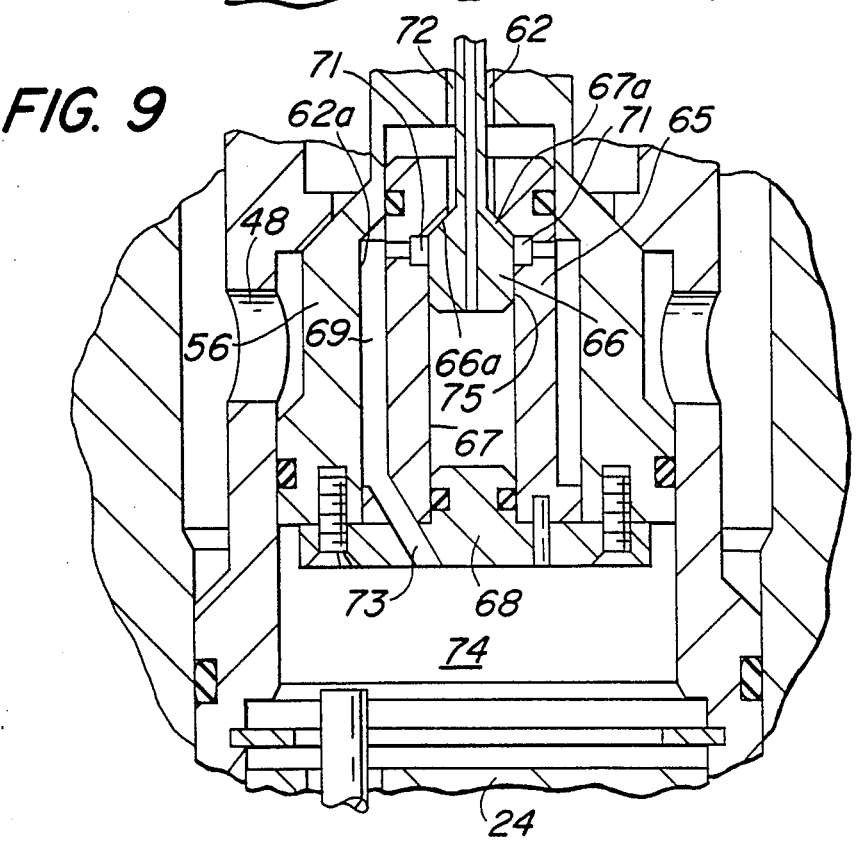
FIG. 9 is an isolated section view of the pilot valve and pilot valve seat of the preferred embodiment.

As seen in FIGS. 8 and 9, the pilot valve is a capillary tube 64 with bulbous end section 66 which slides longitudinally within the central bore of the recirculation stem 56. The bulbous end section 66 is retained within the cylindrical pilot valve chamber 67. The top of the bulbous end section contains beveled lands 66a which mate with a pilot valve seat 67a located at the top of chamber 67. The central conduit of the capillary 63 forms a channel for high pressure liquid between the check valve chamber 29 and the pilot valve chamber. A secondary annular flow channel 72, lies between the outer walls of the capillary tube and the inside walls of the recirculation stem. Annular flow channel 72 connects the top of the pilot valve chamber and the recirculation port 15. When lands 66a mate with seat 67a, flow through channel 72 is closed off.

An additional channel 75 is defined by the outer walls of the bulbous end section 66 and the pilot valve seat 64. Water descending down the capillary tube will enter the pilot valve chamber 67 and will be forced through channel 75 and out ports 71 or alternatively up through flow channel 72. Channel 75 produces a controlled leakage and pressure reduction. When the pilot valve mates with seat 67a, channel 72 is closed off. Water then exits through ports 71 into sleeve 69, through conduit 73 and into the piston chamber 74.

The operation of the present invention is now described with reference to the enclosed Figures. Referring to FIGS. 1 and 2, the inlet chamber 12 is connected to a centrifugal pump and the outlet chamber 14 is connected to a heater. A recirculation conduit 20 connects the inlet port with the recirculation system. In operation, water enters the inlet chamber 12 and is directed into the recirculation conduit 20. The water accordingly enters the water chamber 46 separating the outer and inner sleeves and surrounds the inner sleeve. Water then enters through the four evenly dispersed ports 48 located at the base of the inner sleeve. The water proceeds up the serpentine conduit 70 defined by the interspersed seats and lands. The water exits the recirculation valve through the curvilinear shaped exit 52 located at the far end of the inner sleeve.

Concurrently with the entrance of water into the recirculation conduit, inlet chamber water enters the check valve chamber 29 through gap 45 and descends down the center of pilot valve capillary 63 via gap 33a and into the pilot valve chamber 67 formed between the walls of the cylindrical pilot valve seat 65 and the bulbous end 66 of the pilot valve. The water fills the pilot valve chamber 67 and leaks through annular channel 75. The water exits chamber 67 through channel 72 ad out the recirculation port 15.

As the water pressure on the outlet side drops in response to heater demand, the check valve assembly is thrust upward. The biasing spring 38 contracts and the check valve 21 moves upward toward the bonnet 22. Water from the pump continues to enter the check valve chamber 29 and to descend down the center of pilot valve capillary 63 into the pilot valve chamber 67. Water continues to leak through annular channel 75. As shown in FIG. 6, the build up of pressure in the pilot valve seat forces the pilot valve upward. The capillary tube 64 with bulbous end section 66 thus operates as a hydraulic follower which follows the movement of the check valve 21. Referring to FIG. 7, as the pilot valve moves completely upward, lands 66a comes into contact with the beveled pilot valve seat 67a located at the top of the pilot valve chamber 67. The contact of the lands 66a with seat 67a closes off flow through channel 72. Water flow, effectively shut off through channel 72, exits through ports 71 into sleeve 69 through conduit 73 and into the piston chamber 74 as shown in FIG. 9. The piston chamber 74 fills with water at a pressure approximately the inlet port pressure, thus thrusting the recirculation stem 56 upward. The lands 60 on the stem 56 then mate with a respective seat 47 on the interior wall of the inner sleeve. The beveling 60a of the lands permits the valve to throttle. When the lands 60 mate with their respective seats 46, fluid flow through the recirculation valve and recirculation port is effectively terminated.

When the downstream demand is again reduced (corresponding to an increase in outlet pressure), the check valve mechanism returns toward the direction of seat 32. As the check valve returns toward its seat, it meets the top of the capillary tube 64 at a switch point which is determined by the relative position of screw 33. The downward thrust of the check valve and screw 33 against the top of the capillary unseat the pilot valve lands 66a from seat 67a. The water pressure in the piston chamber 74, now exposed to the low pressure of the recirculation system via channel 72 will attempt to equalize to an intermediate pressure level, and a portion of the water exits the piston chamber 74 back through conduit 73, into sleeve 69 and ports 71, up through the annular channel 72, and finally through recirculation port 15. As the water in the piston chamber 74 exits toward the lower pressure of the recirculation system, the recirculation valve stem accordingly begins its descent toward the end piece 24. The lands disalign with the seats and flow returns out the recirculation port via the serpentine flow conduit 70 and back to the pump. As the check valve completes its descent, the pressure in the piston chamber 74 reduces but will reduce to an intermediate pressure.

An important feature of the present invention is the free and unimpeded mobility of the check valve relative to the recirculation stem. Accordingly, referring to FIG. 7, the maximum stroke of the check valve 21 as designated by distance S must be less than the combined distances between the switch point screw and pilot valve capillary at the fully open position D, and the stroke of the bulbous end within the pilot valve chamber P; i.e. $S < D + P$.

The pilot valve of the present invention thus follows the direction of the check valve and accordingly regulates the pressure and quantity of water in the piston chamber. When the check valve is completely open, the pressure in the piston chamber approximates the pressure at the inlet port. As the check valve assumes an intermediate position, the piston chamber assumes an intermediate pressure between that of the inlet and the recirculation system. When the check valve is completely closed, the recirculation stem is opened as defined by the adjusted screw and the pressure in the piston chamber approaches that of the pressure in the recirculation system.

Figure 10:
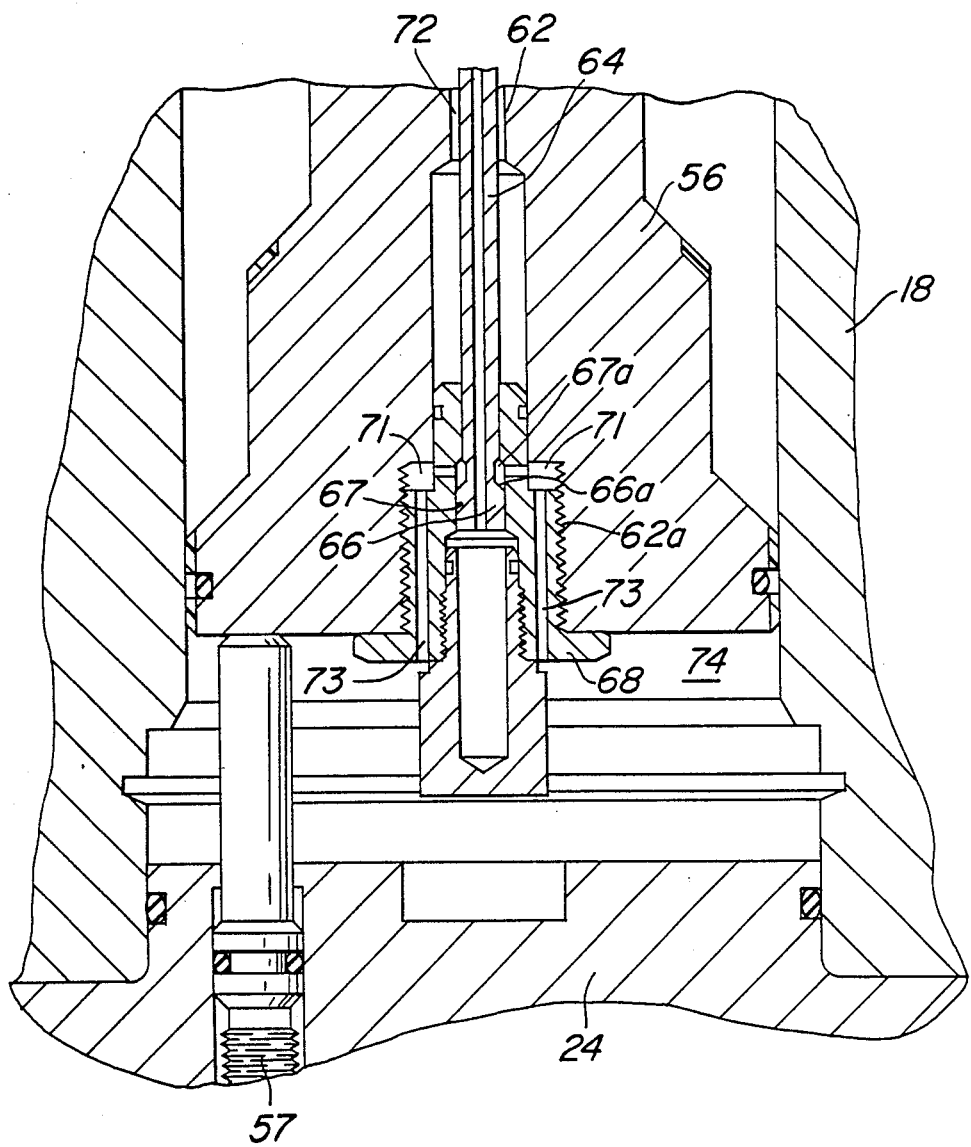
FIG. 10 is an isolated section view of the alternative pilot valve of the preferred embodiment.
Figures 11, 11A:
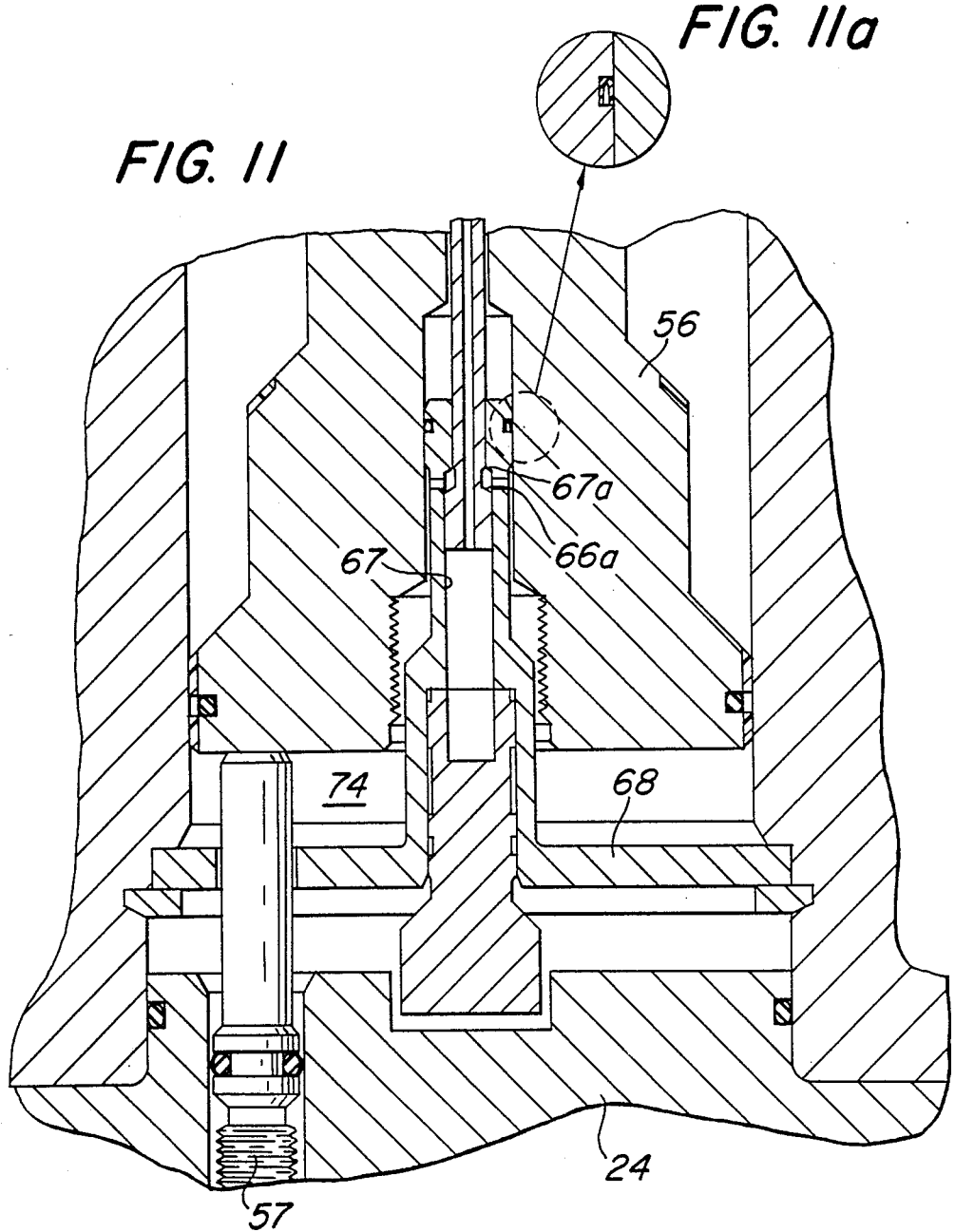
FIG. 11 is an isolated section view of a pilot valve of the preferred embodiment in a non-modulating on-off configuration.

FIGS. 10 and 11 illustrate additional figures of the present invention. FIG. 10 is an enhanced view of the pilot control valve of the present invention.

Referring to FIG. 10, the stem 56 has a central bore 62 which holds a capillary pilot valve 64. The bore 62 widens at the end opposite the check valve. The widened section 62a houses a pilot valve seat 65 which is inserted into the widened section 62a and bolted to the bottom of the stem 56 by an end piece 68. The pilot valve seat 65 comprises a cylindrical chamber 67 which houses the bulbous end 66 of the pilot valve capillary 64. The pilot valve seat contains two ports 71 at the end of the chamber 67 opposite end piece 68 which connect the pilot valve chamber with a hollow sleeve 69 created between the inner wall of the valve stem and the cylindrical pilot valve seat. Two conduits 73 join the ports 71 and a piston chamber 74 situated between the recirculation stem end piece 68 and end plate 24. The piston chamber 74 controls the longitudinal movement and position of the recirculation valve stem.

The pilot valve is a capillary tube 64 with bulbous end section 66 which slides longitudinally within the central bore of the recirculation stem 56. The bulbous end section 66 is retained within the cylindrical pilot valve chamber 67. The top of the bulbous end section contains beveled lands 66a which mate with a pilot valve seat 67a located at the top of chamber 67. The central conduit of the capillary 63 forms a channel for high pressure liquid between the check valve chamber 29 and the pilot valve chamber. A secondary annular flow channel 72, lies between the outer walls of the capillary tube and the inside walls of the recirculation stem. Annular flow channel 72 connects the top of the pilot valve chamber and the recirculation port 15. When lands 66a mate with seat 67a, flow through channel 72 is closed off.

An additional channel 75 is defined by the outer walls of the bulbous end section 66 and the pilot valve seat 64. Water descending down the capillary tube will enter the pilot valve chamber 67 and will be forced through channel 75 and out ports 71 or alternatively up through flow channel 72. Channel 75 produces a controlled leakage and pressure reduction. When the pilot valve mates with seat 67a, channel 72 is closed off. Water then exits through ports 71 through conduits 73 and into the piston chamber 74.

FIG. 11 illustrates pilot valve of the present invention in an on-off configuration. As can be seen in the on-off valve configuration, the valve chamber 67 and seat 67a are bolted to the end plate 68 and thus do not move with the recirculation stem. When the check valve is thrust upward pressure builds up in the pilot valve seat and the pilot valve is thrust upward. The lands 66a come into contact with the seat 67a. Flow through channel 72 is terminated. The piston chamber 74 completely fills at a pressure approaching the inlet port pressure, thus thrusting the recirculation stem 56 upward. Because the position of the pilot valve chamber walls are fixed, the recirculation stem moves upward without modulating. When the descending check valve contacts the capillary stem, the pilot valve is unseated and the piston chamber empties. The recirculation stem then returns to its initial position, without modulating. .

There are a wide number of applications for the valve of the present invention. Typical applications include use in high and low pressure turbine drain and preheating valves, steam turbine stop, throttle valve drains and vent applications. The present invention has been described with reference to a preferred embodiment. It is to be appreciated by those skilled in the art that other embodiments fall within the spirit and scope of the present invention and that the true nature and scope of the invention should be determined with reference to the claims appended hereto.

What is claimed is:

1. A recirculation valve comprising:
    a housing containing an inlet chamber for receiving liquid from a pumping station, an outlet chamber for transporting liquid out of said valve in a downstream direction, and a recirculation port for recirculating liquid back to said pump;
    check valve means dividing said inlet and outlet chambers and extending substantially transverse thereto, said check valve means opening to permit the flow of liquid between said inlet and outlet chambers when said check valve means is in a first position and closing to prevent said flow when said check valve means is in a second position;
    a recirculation channel for transporting liquid between said inlet chamber and by-pass valve means, said by-pass valve means being axially aligned with said check valve means and controlling the flow of liquid between said recirculation channel and said recirculation port, said by-pass valve means comprising a sleeve having at least one seat and a slidable stem having at least one land to slidably mate with said seat to close off flow through said by-pass valve and to disalign from said seat to permit flow through said by-pass valve;
    a liquid piston chamber in communication with said slidable stem for moving said slidable stem between said open and closed positions, said stem moving to close off the flow through said by-pass valve as the quantity of liquid in said piston chamber increases, said stem moving to disalign to permit said flow through said by-pass valve as the liquid in said piston chamber decreases;
    pilot valve means integral with said stem for regulating the liquid quantity within said piston chamber, said pilot valve closing to increase said liquid quantity as said check valve approaches said first position, and opening to decrease said liquid quantity as said check valve approaches said second position; and
    variable means coupled to said check valve for opening said pilot valve.

2. The recirculation valve of claim 1 further comprising means for biasing said check valve means towards a closed position.

3. The recirculation valve of claim 1 further comprising means for adjusting the relative position of said valve stem.

4. The recirculation valve of claim 1 wherein said land is beveled to permit the throttling of liquid through said by-pass valve.

5. The recirculation valve of claim 1 wherein the variable means coupled to said check valve for controlling the opening of pilot valve, the activation point of said pilot valve being varied by the relative position of said screw.

6. A recirculation valve comprising:
    a housing containing an inlet chamber for receiving liquid from a pumping station, an outlet chamber for transporting liquid out of said valve in a downstream direction, and a recirculation port for recirculating liquid back to said pump;
    check valve means dividing said inlet and outlet chambers and extending substantially transverse thereto, said check valve means opening to permit the flow of liquid between said inlet and outlet chambers when said check valve means is in a first position and closing to prevent said flow when said check valve means is in a second position;
    a recirculation channel for transporting liquid between said inlet chamber and by-pass valve means, said by-pass valve means being axially aligned with said check valve means and controlling the flow of liquid between said recirculation channel and said recirculation port, said by-pass valve means comprising a sleeve having at least one seat and a slidable stem having at least one land to slidably mate with said seat to close off flow through said by-pass valve and to disalign from said seat to permit flow through said by-pass valve;
    a piston chamber in communication with said slidable stem for moving said slidable stem between said open and closed positions, said stem moving to close off the flow through said by-pass valve as the liquid pressure in said piston chamber increases, said stem moving to disalign to permit said flow through said by-pass valve as the liquid pressure in said piston chamber decreases;
    a first conduit for transporting pressurized liquid from said inlet conduit to said piston chamber;
    a second conduit for transporting depressurized liquid out from said piston chamber to said recirculation port;
    pilot valve means integral with said stem and in communication with said second conduit for regulating the liquid pressure within said piston chamber, said pilot valve closing to increase said pressure as said check valve approaches said first position, and opening to decrease said pressure as said check valve approaches said second position; and;
    variable means coupled to said check valve for controlling said pilot valve.

7. The recirculation valve of claim 6 further comprising means for biasing said check valve means towards a closed position.

8. The recirculation valve of claim 6 further comprising means for adjusting the relative position of said valve stem.

9. The recirculation valve of claim 6 wherein said land is beveled to permit the throttling of liquid through said by-pass valve.

10. The recirculation valve of claim 6 wherein the variable means coupled to said check valve for controlling the opening of said pilot valve comprises a variable screw which activates said pilot valve, the activation point of said pilot valve being varied by the relative position of said screw.

11. A recirculation valve comprising:
    a housing containing an inlet chamber for receiving liquid from a pumping station, an outlet chamber for transporting liquid out of said valve in a downstream direction, and a recirculation port for recirculating liquid back to said pump;
    check valve means dividing said inlet and outlet chambers and extending substantially transverse thereto, said check valve means opening to permit the flow of liquid between said inlet and outlet chambers when said check valve means is in a first position and closing to prevent said flow when said check valve means is in a second position;
    a check valve chamber for storing a quantity of liquid entering said inlet chamber, at a first pressure;

a recirculation channel for transporting liquid between said inlet chamber and by-pass valve means, said by-pass valve means being axially aligned with said check valve means and controlling the flow of liquid between said recirculation channel and said recirculation port, said by-pass valve means comprising a sleeve having at least one seat and a slidable stem having at least one land to slidably mate with said seat to close off flow through said by-pass valve and to disalign from said seat to permit flow through said by-pass valve;

a piston chamber in communication with said slidable stem for moving said slidable stem between said open and closed positions, said stem closing off the flow through said by-pass valve when said piston chamber fills with liquid having said first pressure, said stem disaligning to permit said flow through said by-pass valve when said piston chamber empties of liquid, said liquid exiting said piston chamber at a second pressure;

a first conduit for transporting liquid stored at said first pressure between said check valve chamber and said piston chamber;

a second conduit for transporting liquid at said second pressure between said piston chamber and said recirculation port;

pilot valve means integral with said stem for controlling the flow of liquid out of said piston chamber through said second conduit, said pilot valve closing to prevent said flow as said check valve approaches said first position, and opening to permit said flow as said check valve approaches said second position; and;

variable means coupled to said check valve for opening said pilot valve, when said check valve approaches said second position.

12. The recirculation valve of claim 11 wherein the movement of said check valve between the open and closed positions is unimpeded by the relative positions of said recirculation stem and pilot valve.

13. The recirculation valve of claim 11 further comprising means for biasing said check valve means towards a closed position.

14. The recirculation valve of claim 11 further comprising means for adjusting the relative position of said valve stem.

15. The recirculation valve of claim 11 wherein said land is beveled to permit the throttling of liquid through said by-pass valve.

16. The recirculation valve of claim 11 wherein the variable means coupled to said check valve for controlling the opening of said pilot valve comprises a variable screw which activates said pilot valve, the activation point of said pilot valve being varied by the relative position of said screw.

* * * * *

UNITED STATES PATENT AND TRADEMARK OFFICE
CERTIFICATE OF CORRECTION

PATENT NO. : 4,967,783
DATED : Nov. 6, 1990
INVENTOR(S) : George Loos

It is certified that error appears in the above-identified patent and that said Letters Patent is hereby corrected as shown below:

On the title page item [57]:
In the Abstract, line 8: "chamber" should be --channel--

Col. 2, line 13: After "pressures" insert --.--

Col. 3, line 48: "value" should be --valve--

Col. 3, after Fig. 11 add:
  --Fig. 11a is an enlarged view of the circled section of Fig. 11 illustrating the configuration of the sealing means.--

Col. 6, line 56: "ad" should be --and--

Col. 7, line 3: "comes" should be --come--

Col. 7, line 11: "approximately" should be --approximating--

Col. 7, line 28: "low" should be --lower--

Col. 9, line 57: After "of" insert --said--

Col. 9, line 57: After "valve" insert --comprises a variable screw which activates said pilot valve--

Signed and Sealed this

Seventeenth Day of March, 1992

Attest:

HARRY F. MANBECK, JR.

*Attesting Officer*  *Commissioner of Patents and Trademarks*